United States Patent
Wegner et al.

(10) Patent No.: US 8,373,322 B2
(45) Date of Patent: Feb. 12, 2013

(54) DRIVE DEVICE

(75) Inventors: Nobert Wegner, Buehl (DE); Andreas Mueller, Herxheim (DE)

(73) Assignee: Robert Bosch GmbH, Stuttgart (DE)

( * ) Notice: Subject to any disclaimer, the term of this patent is extended or adjusted under 35 U.S.C. 154(b) by 383 days.

(21) Appl. No.: 12/668,490

(22) PCT Filed: May 9, 2008

(86) PCT No.: PCT/EP2008/055741
§ 371 (c)(1), (2), (4) Date: Jan. 26, 2010

(87) PCT Pub. No.: WO2009/007156
PCT Pub. Date: Jan. 15, 2009

(65) Prior Publication Data
US 2010/0186548 A1    Jul. 29, 2010

(30) Foreign Application Priority Data
Jul. 9, 2007   (DE) .......................... 10 2007 031 850

(51) Int. Cl.
*H02K 5/10* (2006.01)
(52) U.S. Cl. .......................................... 310/83; 310/89
(58) Field of Classification Search .................. 310/83, 310/89; 74/606 R
See application file for complete search history.

(56) References Cited

U.S. PATENT DOCUMENTS

| | | | | |
|---|---|---|---|---|
| 4,893,039 A | * | 1/1990 | Isii ................................ | 310/89 |
| 5,094,098 A | * | 3/1992 | Hori et al. ..................... | 74/7 E |
| 6,335,580 B1 | | 1/2002 | Cognigni et al. | |

FOREIGN PATENT DOCUMENTS

| DE | 19702685 A1 | 7/1998 |
|---|---|---|
| EP | 0417344 A1 | 3/1991 |
| EP | 0522183 A1 | 1/1993 |
| FR | 2750810 A1 | 1/1998 |
| JP | 2003230245 | 8/2003 |

OTHER PUBLICATIONS

PCT/EP2008/055741 International Search Report.

* cited by examiner

*Primary Examiner* — Dang Le
(74) *Attorney, Agent, or Firm* — Michael Best & Friedrich LLP

(57) ABSTRACT

The invention relates to a drive device (1), in particular for window wiping devices in motor vehicles, having a motor housing (2) which is fixed to a gearbox housing (3) which has a housing upper side (7), and having an air-permeable diaphragm (14) which closes off an opening (15) which is provided in the gearbox housing (3), said diaphragm (14) having the purpose of equalizing pressure when fluctuations in temperature occur. The invention provides that the diaphragm (14) is arranged on a housing side section (16) which runs at an angle to a housing upper side (7). In addition, the invention relates to a motor vehicle having a mounted drive device (1).

21 Claims, 2 Drawing Sheets

DRIVE DEVICE

BACKGROUND OF THE INVENTION

The invention relates to a drive device, in particular for windscreen wiper systems in motor vehicles.

Drive devices are known which comprise an electric motor with a motor housing (pole housing), with a gearing, for example a worm gearing, which is arranged in a gearing housing being connected downstream of the motor shaft of the electric motor. Here, the motor housing is conventionally fixed laterally to the gearing housing, with it being possible for an exchange of air to take place between the interior volume of the motor housing and the interior volume of the gearing housing. During the operation of the drive device, the air within the motor housing and therefore also within the gearing housing warms up. To prevent an undesired pressure rise within the motor housing and/or within the gearing housing, it is known to arrange a diaphragm, which is permeable to air yet water-repellent, in a housing upper side which is generally formed by a plastic lid. To protect the diaphragm from damage during installation, a protective lid with lateral openings for enabling an exchange of air is seated above the diaphragm, which has a generally circular contour. In such known drive devices, it is a disadvantage that the described additional protective lid must be provided to protect the diaphragm arranged on the housing upper side. Furthermore, it is a disadvantage that the known drive devices, in particular on account of the provision of an additional protective cover, are of relatively tall construction, with the result that there is an increased risk of the protective cover being damaged or even knocked off completely during assembly, which in turn increases the risk of damage to the diaphragm. Furthermore, the large installation space requirement of known drive devices having a diaphragm arranged on the housing upper side is a disadvantage.

SUMMARY OF THE INVENTION

The problem addressed by the invention is that of proposing an improved drive device, in particular for windscreen wiper systems in motor vehicles, whose installation space requirement is minimized. The risk of damage to the diaphragm should preferably also be reduced. A further problem addressed is that of proposing a motor vehicle having a correspondingly improved drive device.

The invention has recognized that a diaphragm which is arranged on the housing upper side can be easily damaged, and to protect the diaphragm, it is necessary to provide a separate protective cover, as a result of which in turn the drive device is of tall construction, and therefore the installation space requirement is large. To avoid these disadvantages, the concept of the invention proposes that the diaphragm be arranged laterally on the housing, that is to say on a peripheral wall section of the housing which encloses an angle with the housing upper side, that is to say the areal extent of the housing upper side. The diaphragm should preferably be attached to that housing side to which the motor housing of the electric motor of the drive device is also fixed. Several advantages are surprisingly simultaneously obtained as a result of the lateral arrangement of the at least one diaphragm. Firstly, on account of a lateral, in particular partially hidden arrangement, the diaphragm is better protected from damage, as a result of which it is possible to dispense with a separate protective lid for the diaphragm. In this way, the installation space requirement is reduced, as a result of which the drive device designed according to the concept of the invention can be mounted even under restricted spatial conditions. It is a further advantage that, if the drive device is mounted such that the diaphragm encloses an angle with the horizontal when the drive device is in the mounted state, water impinging on said diaphragm can easily flow off the diaphragm and therefore cannot block the diaphragm.

In one refinement of the invention, it is advantageously provided that the housing section in which the air-exchange hole which is closed off by the diaphragm is formed runs at least approximately at right angles, that is to say at a 90° angle, to the in particular large-area housing upper side, as a result of which the risk of damage to the diaphragm during the installation of the drive device is further minimized.

An embodiment is particularly advantageous in which the diaphragm which is fixed into or onto the housing side section also runs at least approximately perpendicular, that is to say at right angles, to the areal extent of the housing upper side in order that water which impinges on the diaphragm can flow off more easily when the drive device is in the mounted state, in which the housing upper side is preferably aligned at least approximately horizontally.

An embodiment is particularly advantageous in which the housing upper side is defined by a housing lid, in particular by a housing lid surface. Said housing lid surface is preferably the surface of the housing lid with the largest at least approximately planar areal extent. An embodiment is particularly advantageous in which the diaphragm is arranged on a collar which runs in particular at least approximately at right angles to the housing lid surface—the housing section which holds the diaphragm is thus formed by the collar. The collar preferably has a fastening function for fixing the housing lid to a housing base. For this purpose, the collar may for example have fastening recesses into which clamping lugs (clamping springs) can engage. In addition, or alternatively, the housing lid which is composed in particular of plastic may have a latching mechanism or other fastening means for fixing to the rest of the gearing housing. The collar is preferably an encircling collar—though this is not imperatively necessary. It is also conceivable for the collar to be formed by at least one, preferably a plurality of collar section(s) which are spaced apart in the circumferential direction. The collar preferably comprises an encircling end-side groove for holding an annular seal for sealing off the housing lid with respect to the lateral housing peripheral wall.

In one particularly preferred embodiment, the motor housing is arranged on a housing side of the gearing housing on which the housing section which holds the diaphragm is also arranged. The housing section is in particular a collar section of the housing lid.

A drive device designed in this way makes it possible in particular for the diaphragm to be covered laterally at least in sections by the motor housing—in particular such that an air gap of preferably less than 5 mm remains between the motor housing and the diaphragm or the collar of the housing lid, in order to enable an exchange of air between the interior of the gearing housing and the environment. The motor housing, which is preferably produced as a deep-drawn part from metal, therefore serves to protect the diaphragm from damage, in particular during assembly. At least that section of the motor housing end side which covers the diaphragm advantageously extends at least approximately parallel to the housing side section which holds the diaphragm.

There are different options for fixing the diaphragm to the housing section of the gearing housing, in particular to the collar of the gearing housing. In a first alternative, the diaphragm is adhesively bonded and/or welded, in particular ultrasound-welded, to the housing section, in particular to a peripheral edge of the opening which is closed off by the diaphragm.

In a second, preferred alternative, the diaphragm is firstly encapsulated with plastic in a preceding injection-molding process in order to form a support frame for the diaphragm, with the unit composed of support frame and diaphragm being encapsulated in a subsequent injection-molding process during the production of the housing lid. The injection preform (diaphragm+support frame) may for this purpose be placed, as an insert part, into a gearing housing lid tool and sealingly encapsulated. The encapsulation of the diaphragm in a preceding injection-molding step, that is to say the production of an injection preform, is advantageous since the tool temperature of the small tool which is required for this purpose is lower, and therefore the workpiece, that is to say the injection preform, can cool down more quickly. In this way, damage to the diaphragm, which can withstand relatively high temperatures only for a short time, is advantageously minimized. In addition or as an alternative to the encapsulation of the plastic frame of the diaphragm by injection molding, it is possible for the plastic frame to be fixed in a positively locking manner to the housing section of the gearing housing, in particular to the collar of the gearing housing lid. For this purpose, the opening edge which holds the support frame may be of corrugated design at least in sections.

The invention also specifies a motor vehicle having at least one drive device as described above mounted therein. The drive device is advantageously mounted such that the gearing housing upper side, which is preferably defined by a housing lid, is aligned at least approximately horizontally, and as a result, the diaphragm is arranged at least approximately vertically. Here, at least approximately vertically is to be understood to mean an angle with respect to the vertical of a maximum of ±20°. However, the diaphragm preferably encloses a maximum angle with the vertical of ±5°. The diaphragm is particularly preferably aligned exactly vertically.

An embodiment is preferable in which the diaphragm closes off at least two spaced-apart openings in the housing section which connect the interior of the gearing housing to the environment. Should one of the openings become blocked, pressure compensation is still possible through the other opening.

The invention also encompasses all combinations of at least two of the features disclosed in the description, the claims and/or the figures.

BRIEF DESCRIPTION OF THE DRAWINGS

Further advantages, features and details of the invention emerge from the following description of preferred exemplary embodiments and on the basis of the drawings, in which.

DETAILED DESCRIPTION

Figure 1:
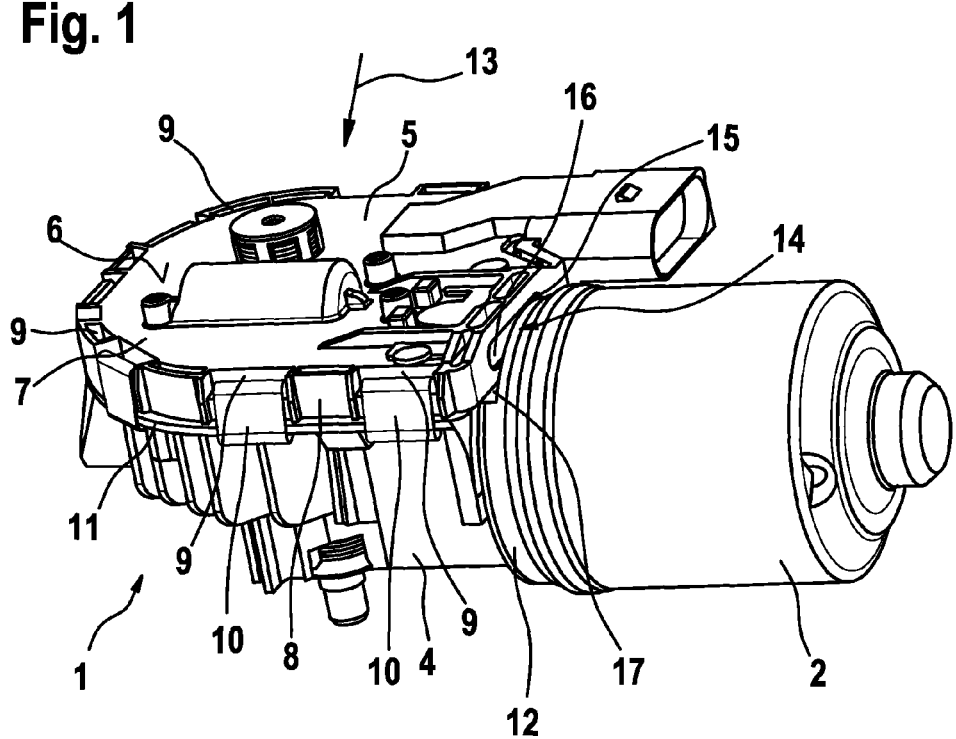
FIG. 1 shows a perspective view of a drive device with a diaphragm arranged laterally on a gearing housing of the drive device.

In the figures, identical components and components having the same function are denoted by the same reference numerals.

FIG. 1 shows a drive device 1 of a windscreen wiper system in a motor vehicle. The drive device comprises an electric motor (not shown) which is arranged in a motor housing 2 (pole housing) and also comprises a gearing (worm gearing, not shown) which is arranged in a gearing housing 3 for the oscillating actuation of a wiper arm. Here, the electric motor is in torque-transmitting engagement with the gearing.

The gearing housing 3 comprises a trough-like base 4 composed of pressure-die-cast aluminum, and a plastic housing lid 5 which is fixed to the base 4. Both the base 4 and also the housing lid 5 are formed from plastic. Here, a housing lid surface 6 defines a housing upper side 7, with an encircling collar 8 running at right angles to the housing lid surface 6. The collar is provided with recesses 9 which are spaced apart in the peripheral direction and into which engages in each case one metal clamp 10 which, at the other end, engages behind a peripheral flange 11 of the base 4.

The motor housing 2 which is formed as a deep-drawn part is flange-mounted on a right-hand housing side 12 of the gearing housing 3 in the plane of the drawing, which right-hand housing side 12 runs approximately perpendicular to the housing upper side 7.

The arrow denoted by 13 points to a known solution from the prior art. A hole which is closed off by a diaphragm is situated in the housing upper side 7, with the diaphragm being covered by a separate protective cap in order to enable an exchange of air between the interior of the gearing housing 3 and the environment. Said solution denoted by the arrow 13 can be dispensed with on account of the solution described below.

An air-permeable and water-repellent diaphragm 14 is arranged on the right-hand housing side 12 in the plane of the drawing. Said diaphragm 14 closes off an opening 15 within a housing side section 16. The housing side section 16 which holds the diaphragm 14 is formed by the collar 8, which runs at right angles to the housing upper side 7, of the housing lid 5. As can be seen particularly clearly from FIG. 1, the elongate diaphragm 14 with rounded ends is covered in sections by an end side, which faces toward the gearing housing 3, of the motor housing 2, with an air gap 17 being formed between the housing side section 16 or the diaphragm 14 and the end side of the motor housing 2, which air gap 17 enables an exchange of air of the interior of the gearing housing 3 and of the motor housing 2 with the environment. Here, the end side of the motor housing 2 extends parallel to the collar 8 and therefore also parallel to the housing side section 16.

An installation situation of the drive device 1 in a motor vehicle is preferable in which the housing upper side 7 of the gearing housing 3 also forms the upper side of the drive device 1, that is to say the housing upper side 7 is aligned at least approximately horizontally, resulting in an at least approximately vertical alignment of the diaphragm 14, as a result of which in turn any water which impinges on the diaphragm 14 can flow off easily.

Figure 2:
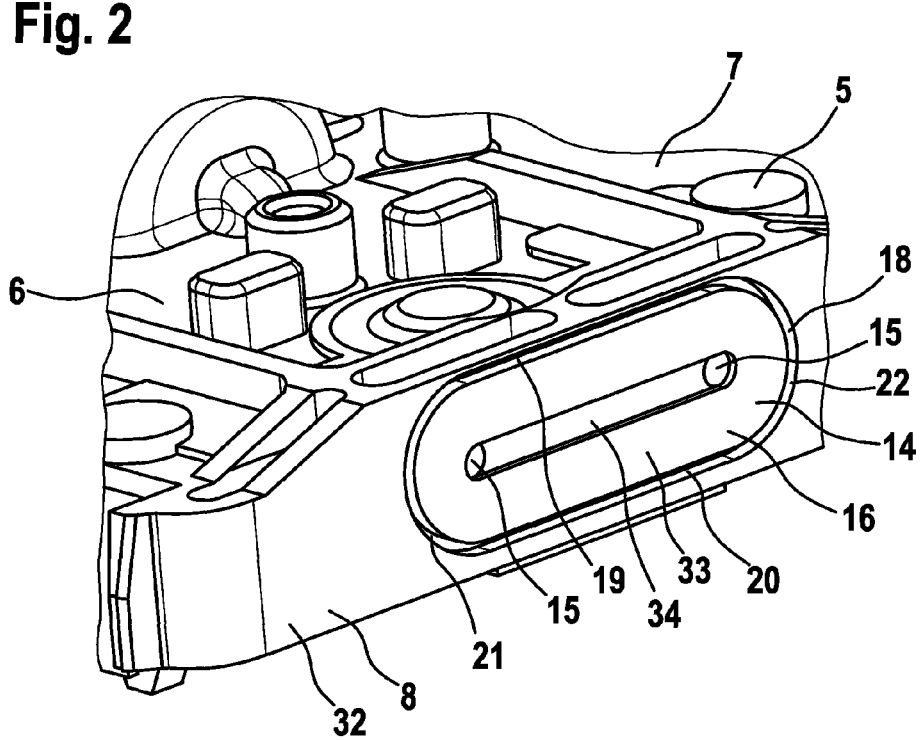
FIG. 2 shows an enlarged detail of a gearing housing lid of a drive device having a diaphragm arranged laterally in a collar of the gearing housing lid.

FIG. 2 shows a detail of a housing lid 5 of a gearing housing 2 of a drive device 1. It is possible to see the housing upper side 7, which is formed by the large-area housing lid surface 6, and the encircling collar 8 which runs at right angles thereto. The encircling collar 8 bears a housing side section 16. The housing side section 16 is recessed rearward in relation to said encircling collar outer surface 32. The housing side section has two parallel elongate longitudinal sides 19, 20 which merge into two opposite rounded end sides 21, 22. The longitudinal sides 19, 20 preferably run parallel to the horizontal plane in the mounted state of the drive device 1. The shape of a diaphragm 14, which is shown as being transparent and which is arranged on the housing side section 16, is matched to the described shape, which is shown in FIG. 2, of the housing side section 16. The housing side section 16 is divided into an outer, annular surface 33, to which the diaphragm 14 is adhesively bonded, and a region 34 situated within the surface 33. The width of the annular surface 33 in the radial direction is approximately 3 mm in the exemplary embodiment shown, and is advantageous for ensuring a permanent fixed connection between the diaphragm 14 and the collar 8.

Situated approximately centrally within the annular surface 33 is the mentioned elongate region 34 which is recessed yet further rearward in relation to the annular surface 33 and which is provided with two spaced-apart end-side openings 15 which lead into the interior of the gearing housing 3. It is theoretically conceivable for only a single opening to be provided. By providing two openings 15, the risk of a blockage of one of the openings 15, in particular by a carbon-dust/grease mixture produced during operation, is reduced. The diaphragm 14 is permeable to air only in the region 34 which, in a central section 14, forms an air exchange duct between the openings 15 behind the diaphragm. In its remaining outer region, the diaphragm 14 is adhesively bonded to the annular surface 33 and consequently bears sealingly against the collar 8.

Figure 3:
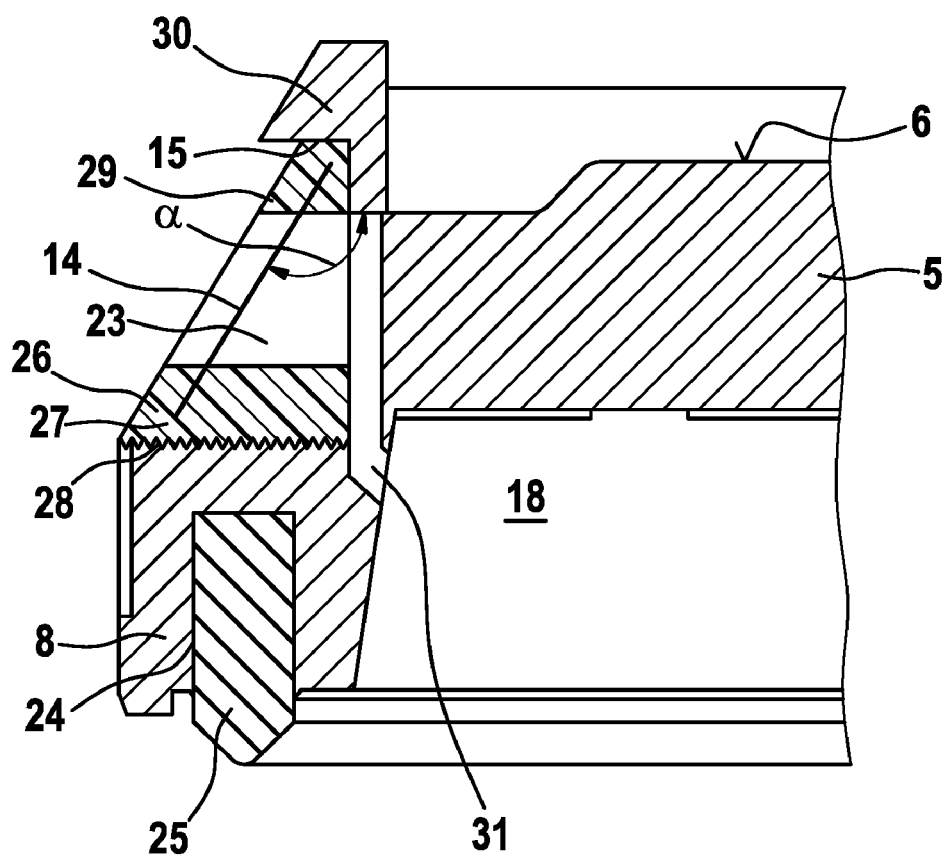
FIG. 3 shows a unit which is designed as an injection preform and which is encapsulated by injection molding with a gearing housing lid, comprising the diaphragm and a peripheral support frame composed of plastic.

FIG. 3 shows a sectional illustration of an alternative option for fastening a diaphragm 14 to a housing lid 5. The housing lid 5 has a housing lid surface 6 which is formed in one piece with an encircling collar 8. The collar 8 is provided with an encircling, downwardly open rectangular contoured groove 24 in which an annular seal 25 for sealing off the housing lid 5 with respect to a base 4 shown in FIG. 1 is illustrated. The diaphragm 14, which in the exemplary embodiment shown in FIG. 3 is inclined at an angle α of approximately 120° with respect to the housing lid surface 6, is surrounded at the periphery by a plastic frame 26, with the plastic frame 26 having been produced as an injection preform in a preceding, separate injection molding step.

The frame 26 has a corrugated underside 27 which is in positively locking engagement with a congruently-shaped corrugated section of the peripheral edge 28 of the opening 15. It can also be seen from FIG. 3 that the underside 27 of the frame 26 has a greater extent transversely with respect to the vertical than the opposite upper side 29 of the frame 26, beyond which a section 30 of the housing lid 5 protrudes radially at the outside.

A region 23 directly behind the diaphragm 14 is connected to a main chamber 18 of the gearing housing via a duct 31 in the housing lid 5.

The invention claimed is:

1. A drive device, having a motor housing (2) which is fixed to a gearing housing (3) which has a housing upper side (7), and having an air-permeable diaphragm (14), which closes off an opening (15) provided in the gearing housing (3), characterized in that the diaphragm (14) is arranged on a housing side section (16) which runs at an angle with respect to a housing upper side (7), characterized in that at least one section (30) of the diaphragm (14) is covered by the motor housing (2), such that an air gap (17) remains.

2. The drive device as claimed in claim 1, characterized in that the housing side section (16) runs at least approximately at right angles to the housing upper side (7).

3. The drive device as claimed in claim 1, characterized in that the diaphragm (14) is arranged in a plane which runs at least approximately perpendicular to the housing upper side (7).

4. The drive device as claimed in claim 1, characterized in that the housing upper side (7) is defined by a housing lid surface (6) of a housing lid (5) having a collar (8) which runs at right angles to the housing lid surface (6).

5. The drive device as claimed in claim 4, characterized in that the housing side section (16) which holds the diaphragm (14) is formed by the collar (8).

6. The drive device as claimed in claim 1, characterized in that the motor housing (2) adjoins a housing side (12) which contains the housing side section (16).

7. The drive device as claimed in claim 1, characterized in that the diaphragm (14) is one of adhesively bonded and welded to the housing side section (16).

8. The drive device as claimed in claim 7, characterized in that the diaphragm (14) is ultrasound-welded to the housing side section (16).

9. The drive device as claimed in claim 1, characterized in that the diaphragm (14) is arranged in an injection-molded frame (26) which is composed of plastic and which is fixed to the housing side section (16).

10. The drive device as claimed in claim 9, characterized in that the frame (26) is fixed in a positively locking manner to the housing side section (16).

11. The drive device as claimed in claim 10, characterized in that the frame (26) is fixed by latching to the housing side section (16).

12. The drive device as claimed in claim 9, characterized in that the injection-molded frame (26) is fixed to the housing side section (16) by being injection-molded in the housing side section (16).

13. The drive device as claimed in claim 1, characterized in that the diaphragm (14) is arranged so as to close off at least two spaced-apart openings (15) which are connected to one another by means of a duct (31) which is arranged on the outer side of the housing side section (16) between the housing side section (16) and the diaphragm (14).

14. A motor vehicle having a windscreen wiper system and a drive device (1) connected to the windscreen wiper system, the drive device having a motor housing (2) which is fixed to a gearing housing (3) which has a housing upper side (7), and having an air-permeable diaphragm (14), which closes off an opening (15) provided in the gearing housing (3), characterized in that the diaphragm (14) is arranged on a housing side section (16) which runs at an angle with respect to a housing upper side (7), characterized in that at least one section (30) of the diaphragm (14) is covered by the motor housing (2), such that an air gap (17) remains.

15. The motor vehicle as claimed in claim 14, characterized in that the diaphragm (14) is arranged in an at least approximately vertical plane.

16. A drive device, for a windscreen wiper system in a motor vehicle, having a motor housing (2) which is fixed to a gearing housing (3) which has a housing upper side (7), and having an air-permeable diaphragm (14), which closes off an opening (15) provided in the gearing housing (3), characterized in that the diaphragm (14) is arranged on a housing side section (16) which runs at an angle with respect to a housing upper side (7), and in that the diaphragm (14) is arranged in an injection-molded frame (26) which is composed of plastic and which is fixed to the housing side section (16) by being injection-molded in the housing side section (16).

17. The drive device as claimed in claim 16, characterized in that the diaphragm (14) is arranged in a plane which runs at least approximately perpendicular to the housing upper side (7).

18. The drive device as claimed in claim 16, characterized in that the housing upper side (7) is defined by a housing lid surface (6) of a housing lid (5) having a collar (8) which runs at right angles to the housing lid surface (6).

19. The drive device as claimed in claim 18, characterized in that the housing side section (16) which holds the diaphragm (14) is formed by the collar (8).

20. The drive device as claimed in claim 16, characterized in that the motor housing (2) adjoins a housing side (12) which contains the housing side section (16).

21. The drive device as claimed in claim 16, characterized in that at least one section (30) of the diaphragm (14) is covered by the motor housing (2), such that an air gap (17) remains.

\* \* \* \* \*

UNITED STATES PATENT AND TRADEMARK OFFICE
CERTIFICATE OF CORRECTION

PATENT NO. : 8,373,322 B2  Page 1 of 1
APPLICATION NO. : 12/668490
DATED : February 12, 2013
INVENTOR(S) : Wegner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 398 days.

Signed and Sealed this
First Day of September, 2015

Michelle K. Lee
*Director of the United States Patent and Trademark Office*